United States Patent
Petrell et al.

(10) Patent No.: US 12,482,203 B1
(45) Date of Patent: *Nov. 25, 2025

(54) ADAPTIVE VISIBILITY ENHANCEMENT IN AUGMENTED REALITY

(71) Applicant: Distance Technologies Oy, Helsinki (FI)

(72) Inventors: Joona Petrell, Tampere (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 19/212,995

(22) Filed: May 20, 2025

(51) Int. Cl.
*G06T 19/00* (2011.01)
*G02B 27/14* (2006.01)

(52) U.S. Cl.
CPC .......... *G06T 19/006* (2013.01); *G02B 27/14* (2013.01)

(58) Field of Classification Search
None
See application file for complete search history.

(56) References Cited

U.S. PATENT DOCUMENTS

2021/0208400 A1* 7/2021 Hong ............... G02B 27/283

OTHER PUBLICATIONS

Hong et al., "See-through optical combiner for augmented reality head-mounted display: index-matched anisotropic crystal lens" 2017. (Year: 2017).*

* cited by examiner

*Primary Examiner* — Nicholas R Wilson
(74) *Attorney, Agent, or Firm* — ZIEGLER IP LAW GROUP, LLC.

(57) ABSTRACT

A system including a tracker, a display, an optical combiner arranged on an optical path of the display and of a real-world light field of a real-world environment, at least one real-world facing camera, and at least one processor. The processor is configured to determine a relative position of each eye of at least one user with respect to the optical combiner using the tracker, generate or retrieve an image to be displayed based on the relative position of each eye of the at least one user with respect to the optical combiner, and determine a corresponding portion of the optical combiner for a given region of the image. The processor is further configured to capture at least one real-world image, calculate a colour difference and a luminance difference, adjust the graphical element based on the differences, and display the image while optically combining it with the real-world light field.

17 Claims, 4 Drawing Sheets

ADAPTIVE VISIBILITY ENHANCEMENT IN AUGMENTED REALITY

TECHNICAL FIELD

The present disclosure relates to augmented reality systems comprising optical combiners and displays configured to display images based on relative positions of eyes of users. The present disclosure also relates to methods for displaying images via optical combiners and displays based on relative positions of eyes of users.

BACKGROUND

See-through displays are commonly employed in augmented reality systems to provide visual access to a real-world environment while also allowing presentation of graphical content. The see-through displays are configured to allow light from the real-world environment to pass through a physical medium, such as a transparent display layer or an optical combiner, while light representing the graphical content is presented from a digital display. In practical implementations, the see-through displays operate by blending light originating from the two distinct sources, including light from the digital display that represents graphical content and light from the real-world environment that enters the see-through display. Thus, a visual experience perceived by the user of the augmented reality system is determined by combined light received from the digital display and the real-world environment.

In operating conditions where the real-world environment includes variable lighting or visual complexity, the visibility of the graphical content presented by the augmented reality system is affected. Light from the real-world environment may introduce distortions, colour shifts, and reduction of contrast in the graphical content. The distortions, colour shifts, and reduction of contrast in the graphical content reduce the visibility of graphical elements when presented in front of a complex or brightly illuminated background of the real-world environment. Further, environmental conditions such as time of day, position of the sun, presence of moving objects behind the see-through display, or changes in ambient illumination contribute to visual interference between the graphical content and the background of the real-world environment, reducing the ability of the user of the augmented reality system to visually distinguish the graphical content from the surrounding elements in the real-world environment.

The visibility of the graphical content is also influenced by individual differences in visual perception among users of the augmented reality system. Visual characteristics of the user, including colour vision deficiency, limited visual acuity, or reduced contrast sensitivity, affect the ability of the user to accurately perceive the graphical content. Thus, the variations in the visual perception among different users introduce further challenges in presenting graphical content that remains visible and interpretable across a range of real-world environments and viewing conditions. Many conventional augmented reality systems provide a range of accessibility settings to enable accurate visual perception among different users across varying real-world environments and viewing conditions. The accessibility settings may include colour filters for users with colour vision deficiency, adjustable brightness or contrast levels, text magnification features, or the use of high-contrast themes.

Therefore, there exists a need to address the limitations of see-through displays in augmented reality systems by improving the visibility and interpretability of graphical content when presented over different backgrounds in the real-world environment. In particular, there is a need for systems and methods that increase the visibility of the graphical content presented by the augmented reality system without relying solely on restricted rendering parameters or on accessibility settings configured in advance.

SUMMARY

The present disclosure seeks to provide a system comprising a display and an optical combiner, the system being configured to display an image based on relative positions of eyes of at least one user with respect to the optical combiner, and a method for displaying the image via the display and the optical combiner based on relative positions of eyes of at least one user with respect to the optical combiner. The aim of the present disclosure is achieved by the system and the method as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
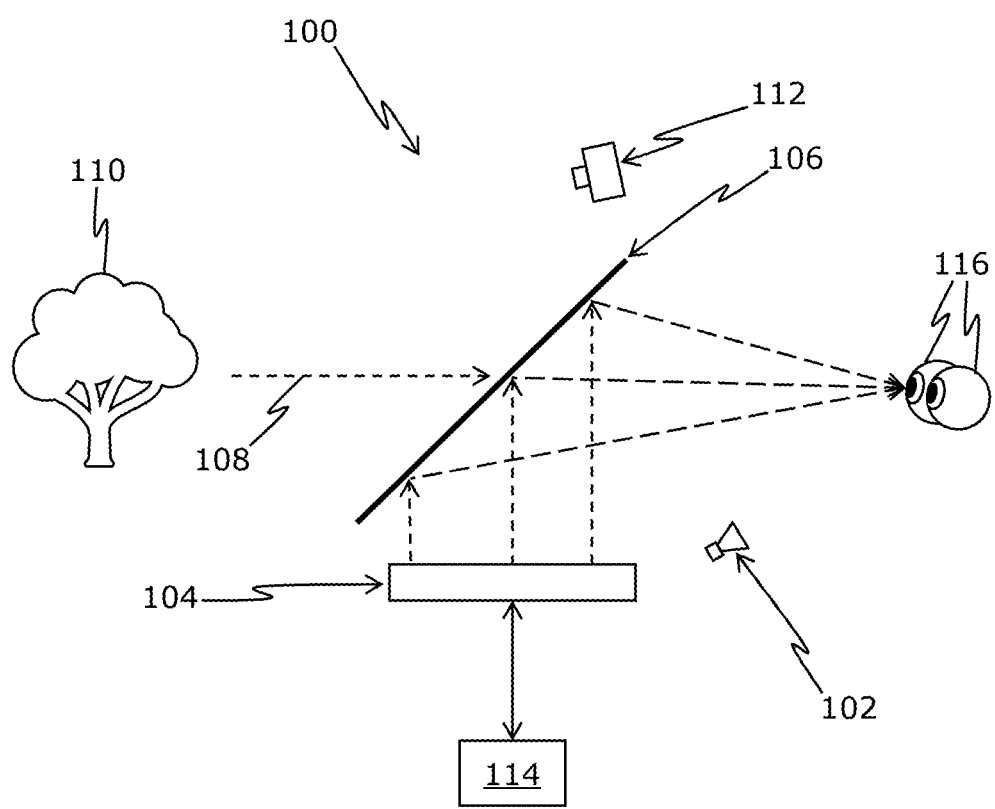
FIG. 1 shows a simplified top view of an augmented reality system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an augmented reality system comprising:
  a tracker;
  a display;
  an optical combiner arranged on an optical path of the display and on an optical path of a real-world light field of a real-world environment;
  at least one real-world facing camera; and
  at least one processor configured to:
    determine a relative position of each eye of at least one user with respect to the optical combiner, using the tracker;

generate or retrieve an image to be displayed, based on the relative position of each eye of the at least one user with respect to the optical combiner;

for a given region of the image that represents a graphical element, determine a corresponding portion of the optical combiner from which light rays of the given region of the image are to be reflected toward a given eye of the at least one user during display of the image, based on a relative position of the given eye with respect to the optical combiner, a relative position and orientation of the optical combiner with respect to the display, and a position of the given region in the image;

capture at least one real-world image of the real-world environment using the at least one real-world facing camera;

determine a colour and luminance of a portion of the real-world light field that passes through the corresponding portion of the optical combiner toward the given eye, based on the at least one real-world image and the relative position of the given eye with respect to the optical combiner;

calculate a colour difference and a luminance difference for the given eye between the colour and luminance of said portion of the real-world light field and a colour and luminance of the graphical element;

adjust at least one of: the colour, the luminance, a size, at least one iconographic parameter of the graphical element in the given region of the image, based on the colour difference and the luminance difference for the given eye; and display the image via the display for producing a synthetic light field, wherein the optical combiner is employed to reflect a corresponding portion of the synthetic light field toward the given eye, whilst optically combining the corresponding portion of the synthetic light field with said portion of the real-world light field.

In a second aspect, the present disclosure provides a method comprising:

determining a relative position of each eye of at least one user with respect to an optical combiner, using a tracker, wherein the optical combiner is arranged on an optical path of a display and on an optical path of a real-world light field of a real-world environment;

generating or retrieving an image to be displayed, based on the relative position of each eye of the at least one user with respect to the optical combiner;

for a given region of the image that represents a graphical element, determining a corresponding portion of the optical combiner from which light rays of the given region of the image are to be reflected toward a given eye of the at least one user during display of the image, based on a relative position of the given eye with respect to the optical combiner, a relative position and orientation of the optical combiner with respect to the display, and a position of the given region in the image;

capturing at least one real-world image of the real-world environment using at least one real-world facing camera;

determining a colour and luminance of a portion of the real-world light field that passes through the corresponding portion of the optical combiner toward the given eye, based on the at least one real-world image and the relative position of the given eye with respect to the optical combiner;

calculating a colour difference and a luminance difference for the given eye between the colour and luminance of said portion of the real-world light field and a colour and luminance of the graphical element;

adjusting at least one of: the colour, the luminance, a size, at least one iconographic parameter of the graphical element in the given region of the image, based on the colour difference and the luminance difference for the given eye; and displaying the image via the display for producing a synthetic light field, wherein the optical combiner is employed to reflect a corresponding portion of the synthetic light field toward the given eye, whilst optically combining the corresponding portion of the synthetic light field with said portion of the real-world light field.

The present disclosure provides the augmented reality system and the method for displaying the image via the display and the optical combiner based on the relative position of each eye of the at least one user with respect to the optical combiner. In certain implementations, the augmented reality system is applied in HUDs (head-mounted displays) and automotive displays that incorporate graphical elements presented over the real-world light field, where the image containing the graphical element is rendered to make the graphical element appear integrated with the portion of the real-world light field visible through the optical combiner.

Advantageously, when the at least one processor has a knowledge pertaining to the position of each eye of the at least one user with respect to the optical combiner, at least one visual inconsistency arising due to the colour difference and the luminance difference of the portion of the real-world light field and the graphical element as represented in a given region of the image is corrected. The correction of the colour difference and the luminance difference enhances an overall viewing experience of the given user. For example, viewing experience in terms of visibility, legibility, and perceptual consistency, when the image is displayed to the given user. The determination of the relative position is beneficial when generating an image (such as in a form of the graphical element) is reflected via the optical combiner, thereby, increasing the immersive quality and comfort of the viewing experience by the given user. The system and the method enable determination of the relative position of each eye even in real-world scenarios, where the given user may undergo head movement or orientation changes. For example, a vehicle, wearable configuration, or handheld setup over a period of time. Further, the system enables the determination of the colour difference and luminance difference for the given eye. The real-world light field varies both spatially and temporally such as in outdoor conditions or within enclosed spaces (for example, a cabin of a vehicle), In outdoor conditions and enclosed spaces, portions of the real-world environment may be exposed to fluctuating lighting over time. The coordination of the tracker, the display, the optical combiner, the at least one real-world facing camera, and the at least one processor enables a technical benefit of adjustment of the graphical element. The adjustment maintains visibility across different portions of the real-world light field, corresponding to each eye of the at least one user. Thus, the augmented reality system provides display of the graphical element as part of the image rendered based on the relative position of each eye of the at least one user with respect to the optical combiner, in a manner responsive to the portion of the real-world light field visible through the optical combiner. The augmented reality system captures the at least one real-world image of the real-world environment using the at least one real-world facing camera, determines the portion of the real-world light field that passes through the corresponding portion of the optical combiner toward the given eye of the at least one user, and calculates the colour difference and the luminance difference between the graphical element and the portion of the real-world light field. The graphical element is adjusted based on the calculated colour difference and the luminance difference to preserve visibility and distinguishability from the portion of the real-world light field.

In one exemplary operating scenario, the augmented reality system is implemented in the automotive display integrated into a windshield of a vehicle. A white graphical element representing a directional arrow is presented over a bright background region of the real-world environment, such as the sky or a sunlit building. In such an exemplary operating scenario, the augmented reality system calculates the luminance of the portion of the real-world light field that passes through the optical combiner and compares the calculated luminance with the luminance of the white graphical element. Further, when the luminance of the graphical element is lower by more than the predefined threshold luminance difference, the luminance of the graphical element is increased. The increased luminance allows the graphical element to remain visually distinguishable under high ambient brightness conditions of the sky or the sunlit building.

In another exemplary operating scenario, the graphical element appears against the region of the real-world environment that contains high visual complexity, such as foliage or a pedestrian crowd. In the aforesaid exemplary scenario, the stroke weight of the graphical element, such as a thickness of a stroke or line used in rendering the graphical element, is increased or a number of features of the graphical element is decreased, thereby reducing a graphical complexity of the graphical element to preserve distinguishability of the graphical element over the visually dense background of the real-world environment.

In yet another exemplary operating scenario, the augmented reality system compensates for chromatic interference between the graphical element and the portion of the real-world light field. In such an exemplary scenario, a red graphical element is displayed over a red portion of the real-world environment, such as a brick wall. The augmented reality system calculates the colour difference between the red graphical element and the brick wall, and determines that the colour difference is below the predefined threshold colour difference. The colour of the graphical element is then adjusted to the contrasting colour based on the contrast criterion. The contrasting colour is selected such that the graphical element remains visually distinguishable from the portion of the real-world light field, even when the colours in the background and the graphical element are similar. Further, the colour of the graphical element is adjusted by shifting a hue of the graphical element from red to a contrasting hue such as cyan, based on a chromatic distance in a perceptually uniform colour space, thereby increasing the colour difference of the graphical element relative to the portion of the real-world light field and maintaining visual separation of the graphical element from the brick wall.

The augmented reality system further provides per-eye adaptation of the graphical element based on inter-eye differences in the portion of the real-world light field. Moreover, when the graphical element is displayed at the depth closer to the user, the viewing directions of the given eye and the another eye diverge, resulting in differences in the respective portions of the real-world light field. The augmented reality system calculates the colour difference and the luminance difference separately for the given eye and the another eye and adjusts the graphical element in the given region of the image using both values. In an exemplary operating scenario, the graphical element overlaps a shadowed portion of the real-world environment for the given eye and a sunlit portion of the real-world environment for the another eye. In such an exemplary operating scenario, the graphical element is then adjusted separately to increase visibility from each viewpoint, while the graphical element in the image remains shared. Optionally, the colour of the graphical element is increased in luminance for the given eye to compensate for the lower brightness of the shadowed portion, and adjusted in hue or stroke weight, such as outline thickness, for the another eye to preserve contrast against the higher brightness of the sunlit portion, thereby allowing the graphical element to remain simultaneously visible from both eyes while occupying the same position in the image.

When the augmented reality system detects that the graphical element appears against different background colours for the given eye and the another eye, and the colour adjustment calculated for the given eye conflicts with the colour adjustment calculated for the another eye, the augmented reality system determines whether the given eye or the another eye is the dominant eye of the at least one user. The colour adjustment based on the dominant eye is applied to the graphical element for both eyes, allowing prioritisation of visibility from the dominant eye. In another condition, the augmented reality system calculates a shared colour adjustment based on both the colour difference and the luminance difference for the given eye and the another eye. The graphical element is then adjusted to a common colour that provides a balance of visibility from both the given eye and the another eye. The common colour, such as a colour selected to offer perceptual contrast across differing background conditions of the real-world environment for the given eye and the another eye, is applied to maintain consistent presentation of the graphical element across both eyes.

The augmented reality system performs capture of the at least one real-world image, detection of the portion of the real-world light field that corresponds to each eye of the at least one user, and adjustment of the graphical element in the image based on real-world visual conditions and the relative position of each eye of the at least one user with respect to the optical combiner. A technical benefit of the augmented reality system is enabling consistent presentation of the graphical element under varying ambient lighting conditions and different colour characteristics of the portion of the real-world light field. A further technical benefit of the augmented reality system is supporting per-eye adjustment of the graphical element when the background for the given eye differs from the background for the another eye, due to spatial divergence in the viewing directions of the eyes. An additional technical benefit of the augmented reality system is maintaining visibility of the graphical element across a wide range of user-specific visual configurations and dynamic real-world environments.

The method provides a technical benefit of allowing display of the image via the display and the optical combiner based on the relative position of each eye of the at least one user with respect to the optical combiner, the portion of the real-world light field that passes through the corresponding portion of the optical combiner toward the given eye, and the colour difference and the luminance difference between the graphical element and the portion of the real-world light field.

The augmented reality system comprises the tracker, the display, the optical combiner arranged on the optical path of the display and on the optical path of the real-world light field of the real-world environment, and the at least one real-world facing camera. The term "optical combiner" as used throughout the present disclosure refers to a semi-transparent optical element arranged to reflect at least a portion of the synthetic light field generated by the display while also allowing transmission of at least a portion of the real-world light field received from the real-world environment. The term "real-world light field" as used throughout the present disclosure refers to a distribution of light rays arriving from the real-world environment toward the at least one user, representing visible content in the real-world environment as perceived through the optical combiner.

The optical combiner is physically positioned along the optical path between the display and the at least one user and along the optical path between the real-world environment and the at least one user. The real-world environment may include objects in the background such as sky, buildings, trees, vehicles, or people, and may vary over time due to changes in lighting, weather, movement, or user perspective. The real-world light field may therefore present different visual properties, including brightness and colour composition, at different times or for different users or different eyes of the at least one user.

The optical combiner enables optical combination of the corresponding portion of the synthetic light field with the portion of the real-world light field that passes through the corresponding portion of the optical combiner toward the given eye of the at least one user. The at least one real-world facing camera is configured to capture at least one real-world image of the real-world environment and enables determination of the colour and the luminance of the portion of the real-world light field that passes through the corresponding portion of the optical combiner toward the given eye of the at least one user. The at least one real-world facing camera may include at least one colour camera, at least one depth camera, or a combination thereof. In certain implementations, the at least one real-world image captured by the at least one real-world facing camera is reprojected based on the relative position of the given eye of the at least one user with respect to the optical combiner to allow alignment of the real-world light field with the image. The reprojection of the at least one real-world image based on the relative position of the given eye of the at least one user provides a technical benefit of enabling accurate comparison between the graphical element and the background of the real-world light field against which the graphical element is displayed.

The augmented reality system further comprises the at least one processor. The at least one processor is configured to perform a sequence of operations that enable the graphical element in the image to be displayed based on the real-world light field and the spatial configuration of each eye of the at least one user with respect to the optical combiner. The at least one processor enables displaying of the image to be based on the relative position of each eye of the at least one user with respect to the optical combiner. The display of the image to be based on the relative position of each eye of the at least one user with respect to the optical combiner ensures customization of the displayed graphical elements for each eye of the user. The at least one processor is further configured to generate or retrieve the image to be displayed based on the relative position of each eye of the at least one user with respect to the optical combiner.

For a given region of the image that represents the graphical element, the at least one processor is configured to determine the corresponding portion of the optical combiner from which light rays of the given region of the image are to be reflected toward the given eye of the at least one user during display of the image, based on the relative position of the given eye with respect to the optical combiner, the relative position and orientation of the optical combiner with respect to the display, and the position of the given region in the image. The term "region" as used throughout the present disclosure refers to an entirety of the image, a group of pixels, or a pixel in the image. The configuration of the at least one processor thereby allows determination of the corresponding portion of the optical combiner based on the region of the image representing the graphical element, and allows the augmented reality system to perform adjustments either for the whole image, for individual parts of the image and corresponding overlapping portions of the real-world light field, or at a pixel level based on the respective location of the pixel in the reprojected real-world image. The operations of determining the corresponding portion of the optical combiner and performing adjustments based on the region of the image and the overlapping portion of the real-world light field are performed similarly for each eye of each user. The consideration that the operation of adjusting the graphical element based on the colour difference and the luminance difference has to be performed separately for each eye of each user takes into account that the portion of the real-world light field may differ for each eye of each user due to spatial divergence between the viewing directions of the eyes, particularly when the graphical element appears close to the at least one user.

The at least one processor is configured to capture the at least one real-world image of the real-world environment using the at least one real-world facing camera. The at least one real-world facing camera is essential for enabling the operation to increase the colour difference or reduce the luminance contrast by providing representative visual data from the real-world environment. The term "real-world facing camera" as used throughout the present disclosure refers to any image acquisition device oriented toward the real-world environment and capable of capturing at least one real-world image. The at least one real-world facing camera may include a colour camera, a depth camera, or a combination thereof, and may operate in conjunction with one or more sensors including an ambient light sensor, an RGB (red, green and blue) sensor, or a spectral light sensor. While the at least one real-world facing camera forms the primary source for determining the real-world image, the additional sensors are usable to support more accurate calculation of the visual properties of the portion of the real-world light field. The at least one real-world image is reprojected based on the relative position of the given eye of the at least one user with respect to the optical combiner, to align the pixel information of the real-world image with the viewpoint of the given eye.

The at least one processor is further configured to determine the colour and the luminance of the portion of the real-world light field that passes through the corresponding portion of the optical combiner toward the given eye, based on the at least one real-world image and the relative position of the given eye with respect to the optical combiner. The term "luminance" as used throughout the present disclosure refers to a measurable quantity representing the actual emitted or perceived brightness of a pixel in candela per square metre. The colour and the luminance of the portion of the real-world light field are determined based on colour and intensity values of pixels in a corresponding portion of the at least one real-world image that represents a region of the real-world environment whose light passes through the corresponding portion of the optical combiner toward the given eye. The pixel intensity values, for example, in an 8-bit representation ranging from 0 to 255, are digital representations that may be converted into luminance using gamma correction and display calibration. Thus, the luminance encompasses both sensor-based measurements and image-based calculations, thereby facilitating integration of multiple real-world data sources into the augmented reality system.

The at least one processor is further configured to calculate a colour difference and a luminance difference for the given eye between the colour and luminance of the portion of the real-world light field and the colour and luminance of the graphical element. The at least one processor is configured to use the calculated colour difference and the luminance difference to adjust at least one of the colour, the luminance, a size, or at least one iconographic parameter of the graphical element in the given region of the image. The term "iconographic parameter" as used throughout the present disclosure refers to a graphical property of the graphical element and includes at least one of a stroke weight, which refers to the thickness of a stroke in a graphical element and may be measured in pixels or as a percentage of the overall size; an outline thickness, which refers to the thickness of an outer boundary line of the graphical element; or a number of features such as edges, vertices, or curves in the graphical element. The adjustment is made to increase the colour difference and to reduce the luminance contrast when the luminance of the real-world light field is higher, by increasing the luminance of the graphical element.

Moreover, the at least one processor is configured to display the image via the display for producing the synthetic light field, such that the optical combiner is employed to reflect the corresponding portion of the synthetic light field toward the given eye of the at least one user, whilst optically combining the corresponding portion of the synthetic light field with the portion of the real-world light field. The display of the image via the display for producing the synthetic light field, such that the optical combiner is employed to reflect the corresponding portion of the synthetic light field toward the given eye of the at least one user whilst optically combining the corresponding portion of the synthetic light field with the portion of the real-world light field, allows the image to appear spatially aligned with the real-world light field as perceived from the viewpoint of the given eye of the at least one user. The at least one processor thereby provides a technical benefit of dynamically modifying the graphical element in the image based on visual properties of the portion of the real-world light field and spatial relationships between the display, the optical combiner, and the given eye. The display and the optical combiner enable a technical benefit of visually integrating the graphical element into the real-world environment by optically combining the synthetic light field with the portion of the real-world light field directed toward the given eye of the at least one user. Thus, the tracker, the at least one real-world facing camera, and the optical combiner, when operated in conjunction with the display and the at least one processor, enable display of the graphical element in a manner that is responsive to the real-world light field conditions and the spatial configuration of the at least one user.

Optionally, the at least one processor is configured to:
  detect when the colour difference is below a predefined threshold colour difference; and
  when it is detected that the colour difference is below the predefined threshold colour difference, adjust the colour of the graphical element by changing it to a contrasting colour relative to the colour of said portion of the real-world light field.

It will be appreciated that, when the colour difference is below the predefined threshold colour difference, the colour of the graphical element is sufficiently similar to the colour of the portion of the real-world light field such that the graphical element may not be perceptually distinguishable from the portion of the real-world light field. The operation of detecting when the colour difference is below the predefined threshold colour difference pertains to measurement of the hue contrast between the graphical element in the image and the portion of the real-world light field. The colour of the graphical element is adjusted to avoid colours detected in the portion of the real-world light field and to modify the colour of the graphical element, including by selecting an alternative colour that is distinct from the colour of the portion of the real-world light field.

Moreover, when the colour difference is detected to be below the predefined threshold colour difference, the at least one processor is optionally configured to adjust the colour of the graphical element by changing the colour of the graphical element to the contrasting colour relative to the colour of the portion of the real-world light field. The term "contrasting colour" as used throughout the present disclosure refers to a colour that is selected based on a contrast criterion to enable the graphical element to remain perceptually distinguishable from the portion of the real-world light field. For example, the colour of the graphical element may be changed to avoid a blue graphical element being presented on a blue background of the real-world environment. When the colour difference is not below the predefined threshold colour difference, adjustment of the colour of the graphical element may be omitted. Thus, when the colour difference is no longer below the predefined threshold colour difference after adjustment, the adjustment of the colour of the graphical element may be reversed.

The contrast criterion may be determined using one or more of the following techniques. The colour difference based on a predefined threshold hue difference may be applied by selecting a colour that differs from the colour of the portion of the real-world light field based on a chromatic distance in a perceptually uniform colour space, including but not limited to CIE Lab, CIE LCh, or other colour difference metrics such as ΔE. The hue contrast may be applied by adjusting the hue of the graphical element to differ from the hue of the portion of the real-world light field by at least a predefined threshold hue difference, in a hue-based colour model such as HSL, HSV, or CIE LCh. The perceptual contrast for colour vision deficiencies may be applied by changing the colour of the graphical element based on known perceptual limitations associated with the at least one user, including red-green or blue-yellow colour blindness, using contrast enhancement techniques including Daltonization. Further, application-specific contrast rules may be applied by selecting an alternative colour for the graphical element based on predefined criteria, heuristics, or outputs of machine learning models trained to enhance contrast in varying lighting conditions.

Optionally, the at least one processor is configured to:
  obtain information indicative of at least one pair of colours that is known to cause perceptual confusion for the at least one user due to colour blindness;

detect when the colour of said portion of the real-world light field and the colour of the graphical element form one of the at least one pair of colours; and when it is detected that the colour of said portion of the real-world light field and the colour of the graphical element form one of the at least one pair of colours, adjust the colour of the graphical element by changing it to another colour that, in combination with the colour of said portion of the real-world light field, does not form any of the at least one pair of colours.

The operation of detecting and adjusting the colour of the graphical element based on the known pair of colours, pertains to identifying combinations of the colour. The combinations include color of the graphical element and the portion of the real-world light field that are known to cause perceptual confusion for users with colour blindness. For example, the pairs of colours may include combinations such as red-green or blue-yellow, which are frequently indistinguishable to users with common types of colour vision deficiency. The processor first receives information indicative of at least one pair of colours that is known to cause such confusion for the user. The colour of the graphical element and the colour of the portion of the real-world light field together form one of the at least one pair of colours. Thereby, the processor adjusts the colour of the graphical element by changing the colour to another colour. The another colour is selected such that, when combined with the colour of the portion of the real-world light field, the colour does not form any of the at least one pair of colours associated with perceptual confusion. The adjustment of the colour of the graphical element by changing it to another colour, that avoids forming a known problematic colour pair, improves perceptual distinguishability of the graphical element for the user. To increase visibility, in some implementation, the colour adjustment may optionally utilize additional contrast enhancement techniques to overcome colour vision deficiencies. For example, grayscale substitution or hue-based colour contrast adjustments. The detection of the problematic pair of colours and the corresponding adjustment of the colour of the graphical element to another colour provides a technical benefit. The technical benefit pertains to adapting the augmented reality presentation to user-specific perceptual limitations. The adapting augmented reality presentation to the user-specific perceptual limitations allow the graphical element to remain visually distinguishable from the portion of the real-world light field. This improves usability and accessibility for users affected by colour blindness.

Optionally, the at least one processor is configured to:

detect when the luminance of said portion of the real-world light field is more than the luminance of the graphical element by more than a predefined threshold luminance difference; and when it is detected that the luminance of said portion of the real-world light field is more than the luminance of the graphical element by more than the predefined threshold luminance difference, perform at least one of:

adjusting the luminance of the graphical element by increasing it;

adjusting the size of the graphical element by increasing it;

adjusting the at least one iconographic parameter of the graphical element by performing at least one of: increasing a stroke weight of the graphical element, increasing an outline thickness of the graphical element, decreasing a number of features in the graphical element.

It is determined that the luminance of the portion of the real-world light field is more than the luminance of the graphical element above predefined threshold luminance difference. The processor adjusts the luminance of the graphical element by increasing the luminance of the graphical element. Additionally, the processor also adjusts the size of the graphical element by increasing the size of the graphical element to enhance visibility thereof under high-luminance conditions. The size adjustment also includes modifying at least one iconographic parameter of the graphical element. The decreasing of the number of features refers to simplifying the shape of the graphical element. The simplification of shape is effective, when the luminance of the portion of the real-world light field is high. This allows the graphical element to remain perceptually distinguishable despite visual complexity or brightness in the background. Further, reduction in number of components, such as edges, vertices, or curves, contributes to maintaining visual clarity of the graphical element in conditions of reduced luminance contrast. If the luminance of the portion of the real-world light field is not more than the luminance of the graphical element by more than the predefined threshold luminance difference, no adjustment is applied. After the adjustment is applied, if the luminance difference no longer exceeds the predefined threshold luminance difference, the adjustment is reversed. Thus, the detection of the luminance difference, and the corresponding adjustment of the graphical element, enables a technical benefit of adaptive enhancement of the graphical element, when poor luminance contrast would otherwise impair visibility.

Optionally, the at least one processor is configured to:

for the given region of the image that represents the graphical element, determine another corresponding portion of the optical combiner from which the light rays of the given region of the image are to be reflected toward another eye of the at least one user during display of the image, based on a relative position of the another eye with respect to the optical combiner, the relative position and orientation of the optical combiner with respect to the display, and the position of the given region in the image;

determine a colour and luminance of another portion of the real-world light field that passes through the another corresponding portion of the optical combiner toward the another eye, based on the at least one real-world image and the relative position of the another eye with respect to the optical combiner;

calculate a colour difference and a luminance difference for the another eye between the colour and luminance of the another portion of the real-world light field and the colour and luminance of the graphical element; and adjust at least one of: the colour, the luminance, the size, the at least one iconographic parameter of the graphical element in the given region of the image, based further on the colour difference and the luminance difference for the another eye, wherein the optical combiner is employed to reflect another corresponding portion of the synthetic light field toward the another eye, whilst optically combining the another corresponding portion of the synthetic light field with the another portion of the real-world light field.

The determination of the relevant parameters for the another eye of the at least one user enables per-eye operations, allowing the processor to perform adjustment of the graphical element separately for each eye. The adjustment of the graphical element separately for each eye of the at least one user is particularly useful. This is useful because portion of the real-world light field visible to the given eye may differ from the portion of the real-world light field visible to the another eye, due to spatial divergence in viewing directions. This happens when the graphical element is positioned close to the at least one user. The presentation of the graphical element remains perceptually consistent across both the given eye and the another eye. The presentation may be achieved by distinct adjustment operations corresponding to each eye. The given region of the image is typically shared across both eyes in a light field image and is subdivided into alternating vertical stripes that correspond to different viewing directions. Using the at least one real-world image and the relative position of the another eye, the processor determines the colour and luminance of the another portion of the real-world light field. This real-world light passes through the another corresponding portion of the optical combiner toward the another eye. The processor calculates the colour difference and the luminance difference for the another eye, between the colour and luminance of the another portion of the real-world light field and those of the graphical element. Based on the calculated colour difference and the luminance difference, the processor adjusts at least one of: the colour, the luminance, the size, or the at least one iconographic parameter of the graphical element in the given region of the image. The per-eye adjustment complements the corresponding adjustment made for the given eye. This enables the graphical element to remain visually coherent and readable for both eyes, even under asymmetric lighting conditions. The optical combiner is employed to reflect the another corresponding portion of the synthetic light field toward the another eye, while optically combining that portion with the another portion of the real-world light field. The optical combination of the corresponding portion of the synthetic light field with the another portion of the real-world light field enables the processor to individually adapt the graphical element for each eye while ensuring that both eyes perceive a consistent and unified visual experience.

Optionally, the at least one processor is configured to:
  detect when the colour of said portion of the real-world light field differs from the colour of the another portion of the real-world light field, and when an adjustment in the colour of the graphical element for the given eye conflicts with an adjustment in the colour of the graphical element for the another eye; and
  when it is detected that the colour of said portion of the real-world light field differs from the colour of the another portion of the real-world light field, and that the adjustment in the colour of the graphical element for the given eye conflicts with the adjustment in the colour of the graphical element for the another eye,
    determine whether the given eye or the another eye is a dominant eye of the at least one user; and
    adjust the colour of the graphical element for both the given eye and the another eye, based on the colour difference and the luminance difference for the dominant eye.

The processor handles operating conditions in which the real-world background for the graphical element appears differently to the given eye and the another eye of the at least one user. The aforesaid operating conditions occur when the colour of the portion of the real-world light field differs from the colour of the another portion of the real-world light field between the eyes of the at least one user, resulting in conflicting requirements for adjusting the colour of the graphical element for the given eye and the another eye. The processor performs a determination of whether the given eye or the another eye is the dominant eye of the at least one user. The determination of whether the given eye or the another eye is the dominant eye of the at least one user enables the processor to resolve the conflict by prioritising perceptual visibility from the perspective of the dominant eye.

The adjustment in the colour of the graphical element for both the given eye and the another eye based on the colour difference and the luminance difference for the dominant eye ensures that the graphical element remains perceptually coherent, even when the real-world light field differs between the viewing directions. The adjustment of the graphical element is performed to maintain readability and consistency across both eyes, while providing a unified rendering of the graphical element under varying ambient lighting conditions.

Optionally, the at least one processor is configured to:
  detect when the colour of said portion of the real-world light field differs from the colour of the another portion of the real-world light field, and when an adjustment in the colour of the graphical element for the given eye conflicts with an adjustment in the colour of the graphical element for the another eye; and
  when it is detected that the colour of said portion of the real-world light field differs from the colour of the another portion of the real-world light field, and that the adjustment in the colour of the graphical element for the given eye conflicts with the adjustment in the colour of the graphical element for the another eye,
    determine a compromise colour for both the given eye and the another eye, based on the colour difference and the luminance difference for the given eye, and the colour difference and the luminance difference for the another eye; and
    adjust the colour of the graphical element by changing it to the compromise colour for both the given eye and the another eye.

The processor enables resolution of conflicting adjustment conditions, which arise when the graphical element is viewed against different backgrounds by the given eye and the another eye of the at least one user. The conflict corresponds to situations in which the adjustment in the colour of the graphical element based on the colour difference and luminance difference for each eye results in incompatible visibility requirements, and a balanced solution is required to achieve coherent and readable presentation for both viewing perspectives. Upon detection of the conflict, the processor performs the determination of the compromise colour that is based on the colour difference and luminance difference for the given eye and the another eye. The term "compromise colour" refers to a visual attribute selected to maintain sufficient visibility of the graphical element for both the given eye and the another eye, even when the real-world background content differs between the two viewpoints. The compromise colour is determined to avoid favouring one eye over the other and to maintain perceptual balance. The adjustment of the graphical element to the compromise colour ensures a unified appearance that maintains adequate contrast with both the portion and the another portion of the real-world light field, thereby enabling readability and visual consistency across both eyes of the at least one user.

Optionally, the augmented reality system further comprising a speaker, wherein the at least one processor is configured to:
  detect when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye,
output a voice notification related to the graphical element via the speaker.

The detection of when the colour of the portion of the real-world light field differs from the colour of the another portion of the real-world light field, and when an adjustment in the colour of the graphical element for the given eye conflicts with an adjustment in the colour of the graphical element for the another eye, indicates a condition in which adequate visibility of the graphical element cannot be maintained. In such a condition, it becomes necessary to provide an additional or alternative channel for conveying information associated with the graphical element. To address this, the augmented reality system further comprises a speaker that is configured to output auditory information to the at least one user. The output of a voice notification related to the graphical element via the speaker enables delivery of relevant information through an auditory channel, thereby reducing reliance on the visual presentation alone. The voice notification becomes particularly effective in scenarios where differences in the real-world light field between the given eye and the another eye result in conflicting adjustments, making it difficult to render the graphical element in a consistently readable manner for both eyes. By using the speaker, the system is capable of reinforcing or replacing the visual presentation with the voice notification, ensuring uninterrupted access to critical information associated with the graphical element, even when visual contrast is reduced or graphical consistency cannot be maintained across both eyes. Optionally, the augmented reality system further comprising at least one real-world facing depth camera, wherein the at least one processor is configured to:

determine gaze directions of the eyes of the at least one user, using the tracker;

determine a focus depth at which the at least one user is gazing, based on the gaze directions of the eyes;

generate a depth map of the real-world environment using the at least one real-world facing depth camera;

determine an optical depth at which a real-world object is present, based on the depth map and the gaze directions of the eyes;

detect when a first difference between the focus depth and an optical depth at which the graphical element is being presented via the synthetic light field is smaller than a first predefined threshold difference, and when a second difference between the focus depth and the optical depth at which the real-world object is present is greater than a second predefined threshold difference; and when it is detected that the first difference is smaller than the first predefined threshold difference and the second difference is greater than the second predefined threshold difference, perform at least one of:

apply a defocus blur on the at least one real-world image of the real-world environment, before determining the colour and luminance of said portion of the real-world light field;

expand the corresponding portion of the optical combiner used for determining the colour and luminance of said portion of the real-world light field.

The determination of the gaze directions of the eyes of the at least one user enables calculation of the focus depth, which represents the depth at which the user is gazing within the environment. Using the focus depth and the depth map generated by the at least one real-world facing depth camera, the system determines the optical depth at which a real-world object is present along the user's gaze directions. The first difference smaller than the first predefined threshold difference indicates that the graphical element is being presented near the focus depth, while the second difference greater than the second predefined threshold difference indicates that the real-world object is located at an optical depth far from the focus depth. These conditions together confirm that the at least one user is gazing at the graphical element rather than at the real-world object. When this condition is detected, the system performs one or more adaptive operations related to the processing of the real-world light field. Specifically, the system either applies a defocus blur to the at least one real-world image prior to determining the colour and luminance of the relevant portion of the real-world light field, or expands the corresponding portion of the optical combiner involved in such determination. These operations support a more accurate and gaze-responsive determination of colour and luminance, especially in scenarios where the user is gazing at the graphical element, and the surrounding real-world content is located at an optical depth that differs significantly from the focus depth. Optionally, the at least one processor is configured to:

determine gaze directions of the eyes of the at least one user, using the tracker;

detect when the image represents a plurality of graphical elements; and when it is detected that the image represents the plurality of graphical elements,
identify a graphical element from the plurality of graphical elements based on the gaze directions of the eyes; and
perform the step of determining the corresponding portion of the optical combiner, the step of determining the colour and luminance of the portion of the real-world light field, the step of calculating the colour difference and the luminance difference, and the step of adjusting, for the graphical element that is identified based on the gaze directions.

The determination of the gaze directions of the eyes of the at least one user enables the processor to understand the user's point of visual attention within the image. When the image contains a plurality of graphical elements, the processor uses the gaze directions to identify the specific graphical element that the user is currently observing. By identifying only one graphical element of interest based on the gaze direction, the processor selectively applies subsequent processing steps to the visually relevant content. The selective execution of processing step avoids unnecessary computation on other graphical elements that are not being viewed. Thus, the selectivity in processing step improves in computational efficiency. For the graphical element identified in this manner, the processor determines the corresponding portion of the optical combiner from which the light rays of the graphical element are reflected toward the user's eyes. The processor then determines the colour and luminance of the portion of the real-world light field that passes through that corresponding portion toward the user. Based on this, the processor calculates the colour difference and luminance difference between the real-world light field and the graphical element, and subsequently adjusts the graphical element, specifically at least one of the colour, luminance, size, or at least one iconographic parameter, to improve visual clarity and contextual blending with the background to enhance the perceptual quality of the rendered image. Through colour adjustment and luminance correction, the processor maintains visual consistency and readability for both the given eye and the another eye. This is important in scenarios where other graphical elements are present in peripheral vision but do not require visual refinement. Overall, the gaze-driven identification and selective processing step execution provides a technical benefit of reducing unnecessary rendering load, improving accuracy in contextual adjustment, and delivering a visually coherent augmented reality experience that aligns with the natural focus of the user.

Optionally, the at least one processor is configured to:
determine at least one of: a colour scheme, a colour temperature, of at least the portion of the real-world light field, based on the at least one real-world image;
determine a colour grading adjustment for the graphical element, based on the luminance of said portion of the real-world light field, and the at least one of: the colour scheme, the colour temperature, of at least the portion of the real-world light field; and
adjust the colour of the graphical element by applying the colour grading adjustment.

The determination of at least one of: the colour scheme, the colour temperature, of at least the portion of the real-world light field is performed based on the at least one real-world image. The colour scheme refers to the distribution of colours present in the portion of the real-world light field, and the colour temperature corresponds to the perceptual warmth or coolness of that portion. The determination can be done either locally (i.e., focusing on specific area based on gaze location or specific graphical element) or globally (i.e., on the entire scene/image). In some implementations, the determination may further incorporate additional data (such as data from a light sensor) to enhance accuracy under variable lighting conditions. Based on the luminance of said portion of the real-world light field, and the at least one of: the colour scheme, the colour temperature, the processor determines a colour grading adjustment for the graphical element. The colour grading adjustment refers to a modification derived from environmental context that aligns the appearance of the graphical element with the visual characteristics of the surrounding real-world light field. The adjustment may involve alternation of at least on of hue, saturation, and brightness to achieve consistency. Further, the processor adjusts the colour of the graphical element by applying the colour grading adjustment such that graphical element is rendered that visually integrates with background. As a result, the graphical element appears natural and coherent within the scene, enhancing overall perceptual realism, legibility, and immersion.

The present disclosure further relates to the method as described above. Various embodiments and variants disclosed above with respect to the augmented reality system described in the first aspect, apply mutatis mutandis to the method in the second aspect.

Optionally, the method comprises configuring one of the first reflective interface and the second reflective interface to comprise a given layer. The one of the first reflective interface and the second reflective interface that is semi-transparent comprises an active liquid crystal (LC) layer, wherein the method further comprises:
determining at least one portion of the active LC layer through which the synthetic light field representing at least one virtual object passes, based on a position and a size of the at least one virtual object in a field of view of the at least one autostereoscopic display; and
adjusting a refractive index of at least a part of a remaining portion of the active LC layer, to increase reflectivity of the real-world light field at least at the part of the remaining portion.

A key technical benefit of determining the at least one portion of the active LC layer through which the synthetic light field representing the at least one virtual object passes, and adjusting a refractive index of at least a part of a remaining portion of the active LC layer to increase reflectivity of the real-world light field at least at the part of the remaining portion, is enhancement of the reflectivity of the real-world light field at locations not used for transmission of the synthetic light field. The determination of the at least one portion of the active LC layer based on a position and a size of the at least one virtual object in a field of view of the at least one autostereoscopic display enables identification of areas of the active LC layer required for producing the synthetic light field corresponding to the at least one virtual object. The adjustment of the refractive index of at least a part of the remaining portion allows modulation of the optical properties of the active LC layer in regions not used for transmitting the synthetic light field, thereby increasing the reflectivity of the real-world light field at those regions. The increased reflectivity of the real-world light field improves clarity of the real-world environment perceived through the semi-transparent one of the first reflective interface and the second reflective interface, while avoiding unnecessary degradation of real-world visibility outside the virtual object display areas. The modulation of the optical properties of the active LC layer in regions not used for transmitting the synthetic light field contributes to improved contrast between the real-world light field and the synthetic light field and supports presentation of the at least one virtual object without diminishing the perceptual integrity of the real-world environment.

Optionally, the method further comprising:
detecting when the colour difference is below a predefined threshold colour difference; and
when it is detected that the colour difference is below the predefined threshold colour difference, adjusting the colour of the graphical element by changing it to a contrasting colour relative to the colour of said portion of the real-world light field.

A key technical benefit of detecting that the colour difference is below the predefined threshold colour difference and adjusting the colour of the graphical element by changing it to a contrasting colour relative to the colour of the portion of the real-world light field is enhancement of whether the graphical element is distinguishable from the portion of the real-world light field of the graphical element when presented over backgrounds with similar chromatic characteristics. The detection of the colour difference enables identification of cases where the graphical element lacks sufficient colour difference based on a predefined threshold hue difference from the portion of the real-world light field, which may impair readability or visibility of the graphical element. The adjustment of the colour of the graphical element by changing it to the contrasting colour allows compensation for such cases by selecting a colour that provides increased visual separation from the colour of the portion of the real-world light field. The use of a contrasting colour facilitates preservation of visibility across varying environmental lighting conditions and supports presentation of graphical content with reduced risk of blending into the background. The process of detecting that the colour difference is below the predefined threshold colour difference and adjusting the colour of the graphical element by changing the colour of the graphical element to the contrasting colour contributes to consistent legibility of the graphical element regardless of colour similarities between the image and the portion of the real-world light field visible through the optical combiner.

Optionally, the method further comprising:
obtaining information indicative of at least one pair of colours that is known to cause perceptual confusion for the at least one user due to colour blindness;
detecting when the colour of said portion of the real-world light field and the colour of the graphical element form one of the at least one pair of colours; and
when it is detected that the colour of said portion of the real-world light field and the colour of the graphical element form one of the at least one pair of colours, adjusting the colour of the graphical element by changing it to another colour that, in combination with the colour of said portion of the real-world light field, does not form any of the at least one pair of colours.

A key technical benefit of obtaining information indicative of at least one pair of colours that is known to cause perceptual confusion for the at least one user due to colour blindness, detecting that the colour of the portion of the real-world light field and the colour of the graphical element form one of the at least one pair of colours, and adjusting the colour of the graphical element by changing it to another colour that, in combination with the colour of the portion of the real-world light field, does not form any of the at least one pair of colours, is improvement in the visibility of the graphical element for users affected by colour vision deficiencies. The detection of problematic colour combinations allows identification of cases where the graphical element may be indistinguishable from the portion of the real-world light field for the at least one user. The adjustment of the colour of the graphical element by changing it to another colour that avoids the known pair of colours enables presentation of the graphical element in a manner that remains distinguishable in the presence of colour blindness. The application of colour substitution based on known perceptual limitations contributes to accessibility of the graphical element and supports consistent user experience across a broader range of visual conditions.

Optionally, the method further comprising:
detecting when the luminance of said portion of the real-world light field is more than the luminance of the graphical element by more than a predefined threshold luminance difference; and
when it is detected that the luminance of said portion of the real-world light field is more than the luminance of the graphical element by more than the predefined threshold luminance difference, performing at least one of:
adjusting the luminance of the graphical element by increasing it;
adjusting the size of the graphical element by increasing it;
adjusting the at least one iconographic parameter of the graphical element by performing at least one of: increasing a stroke weight of the graphical element, increasing an outline thickness of the graphical element, decreasing a number of features in the graphical element.

A key technical benefit of detecting that the luminance of the portion of the real-world light field is more than the luminance of the graphical element by more than the predefined threshold luminance difference, and performing at least one of increasing the luminance of the graphical element, increasing the size of the graphical element, or adjusting the at least one iconographic parameter of the graphical element by increasing a stroke weight, increasing an outline thickness, or decreasing a number of features, is enhancement of the visibility of the graphical element when presented against bright real-world backgrounds. The detection of the luminance difference enables identification of conditions in which the graphical element may be visually obscured due to insufficient contrast with the portion of the real-world light field. The adjustment of the luminance of the graphical element by increasing the luminance of the graphical element allows the graphical element to become more perceptually prominent under conditions in which the graphical element is presented against bright real-world backgrounds. Further, increasing the size of the graphical element improves recognition by enlarging the spatial footprint of the graphical element in the image. The adjustment of the at least one iconographic parameter further enhances visibility of the graphical element by simplifying or boldening the shape of the graphical element. In particular, decreasing a number of features in the graphical element reduces visual complexity, thereby allowing the graphical element to remain distinguishable under conditions of high background luminance. The combined effect of the adjustment of the luminance of the graphical element, the adjustment of the size of the graphical element, and the adjustment of the at least one iconographic parameter of the graphical element contributes to consistent presentation of graphical content under varying lighting conditions in the real-world environment.

Optionally, the method further comprising:
for the given region of the image that represents the graphical element, determining another corresponding portion of the optical combiner from which the light rays of the given region of the image are to be reflected toward another eye of the at least one user during display of the image, based on a relative position of the another eye with respect to the optical combiner, the relative position and orientation of the optical combiner with respect to the display, and the position of the given region in the image;
determining a colour and luminance of another portion of the real-world light field that passes through the another corresponding portion of the optical combiner toward the another eye, based on the at least one real-world image and the relative position of the another eye with respect to the optical combiner;
calculating a colour difference and a luminance difference for the another eye between the colour and luminance of the another portion of the real-world light field and the colour and luminance of the graphical element; and
adjusting at least one of: the colour, the luminance, the size, the at least one iconographic parameter of the graphical element in the given region of the image, based further on the colour difference and the luminance difference for the another eye,
wherein the optical combiner is employed to reflect another corresponding portion of the synthetic light field toward the another eye, whilst optically combining the another corresponding portion of the synthetic light field with the another portion of the real-world light field.

A key technical benefit of determining the another corresponding portion of the optical combiner from which the light rays of the given region of the image are to be reflected toward the another eye of the at least one user, determining the colour and the luminance of the another portion of the real-world light field that passes through the another corresponding portion of the optical combiner toward the another eye, calculating the colour difference and the luminance difference for the another eye, and adjusting at least one of the colour, the luminance, the size, or the at least one iconographic parameter of the graphical element based further on the colour difference and the luminance difference for the another eye, is accurate and consistent presentation of the graphical element to each eye of the at least one user, even under conditions where the portion of the real-world light field differs between the given eye and the another eye. The determination of the another corresponding portion of the optical combiner and the another portion of the real-world light field enables independent evaluation of the visual characteristics experienced by the another eye of the at least one user. The calculation of the colour difference and the luminance difference for the another eye allows individualised adjustment of the graphical element that accounts for inter-eye perceptual variation caused by differing real-world backgrounds. The adjustment of visual properties of the graphical element for the another eye complements similar adjustment operations for the given eye, while preserving coherence across both viewing perspectives. The use of the optical combiner to reflect the another corresponding portion of the synthetic light field toward the another eye, while combining it with the another portion of the real-world light field, supports presentation of the graphical element across both eyes of the at least one user of the graphical element in the synthetic light field, contributing to stable and reliable visual perception across both eyes of the at least one user.

Optionally, the method further comprising:
detecting when the colour of said portion of the real-world light field differs from the colour of the another portion of the real-world light field, and when an adjustment in the colour of the graphical element for the given eye conflicts with an adjustment in the colour of the graphical element for the another eye; and
when it is detected that the colour of said portion of the real-world light field differs from the colour of the another portion of the real-world light field, and that the adjustment in the colour of the graphical element for the given eye conflicts with the adjustment in the colour of the graphical element for the another eye,
determining whether the given eye or the another eye is a dominant eye of the at least one user; and
adjusting the colour of the graphical element for both the given eye and the another eye, based on the colour difference and the luminance difference for the dominant eye.

A key technical benefit of detecting that the colour of the portion of the real-world light field differs from the colour of the another portion of the real-world light field, detecting that the adjustment in the colour of the graphical element for the given eye conflicts with the adjustment in the colour of the graphical element for the another eye, determining whether the given eye or the another eye is a dominant eye of the at least one user, and adjusting the colour of the graphical element for both the given eye and the another eye based on the colour difference and the luminance difference for the dominant eye, is prioritisation of perceptual consistency and readability of the graphical element from the perspective of the dominant eye of the at least one user. The detection of differing background colours for the given eye and the another eye, along with the identification of a conflict in the respective adjustments, enables identification of situations in which a single adjustment based on the focus depth and the optical depth cannot simultaneously optimise visibility for both eyes. The determination of the dominant eye allows the method to resolve this conflict by selecting the colour difference and the luminance difference corresponding to the dominant eye as the basis for adjustment. The subsequent adjustment of the colour of the graphical element for both the given eye and the another eye maintains presentation of the graphical element across both eyes of the at least one user that remains consistent for both the given eye and the another eye, while ensuring that visibility of the graphical element is preserved from the perspective of the eye that contributes more strongly to visual perception. The adjustment of the graphical element based on visibility requirements of the dominant eye contributes to reliable presentation of the graphical element across the given eye and the another eye under conditions of asymmetric background visibility.

Optionally, the method further comprising:
detecting when the colour of said portion of the real-world light field differs from the colour of the another portion of the real-world light field, and when an adjustment in the colour of the graphical element for the given eye conflicts with an adjustment in the colour of the graphical element for the another eye; and
when it is detected that the colour of said portion of the real-world light field differs from the colour of the another portion of the real-world light field, and that the adjustment in the colour of the graphical element for the given eye conflicts with the adjustment in the colour of the graphical element for the another eye,
determining a compromise colour for both the given eye and the another eye, based on the colour difference and the luminance difference for the given eye, and the colour difference and the luminance difference for the another eye; and
adjusting the colour of the graphical element by changing it to the compromise colour for both the given eye and the another eye.

A key technical benefit of detecting that the colour of the portion of the real-world light field differs from the colour of the another portion of the real-world light field, detecting that the adjustment in the colour of the graphical element for the given eye conflicts with the adjustment in the colour of the graphical element for the another eye, determining a compromise colour for both the given eye and the another eye based on the colour difference and the luminance difference for the given eye and the another eye, and adjusting the colour of the graphical element by changing it to the compromise colour for both the given eye and the another eye, is coordinated resolution of inter-eye conflicts in graphical element visibility through a balanced colour adjustment. The detection of differing background colours and the resulting conflict in colour adjustments for each eye enables identification of a condition in which individualised adjustments are incompatible with a consistent presentation of the graphical element. The determination of the compromise colour based on the colour difference and the luminance difference for both the given eye and the another eye allows computation of an adjustment based on the focus depth and the optical depth that maximises visibility across both eyes of the at least one user. The adjustment of the graphical element by changing it to the compromise colour for both the given eye and the another eye contributes to unified presentation of the graphical element across both eyes of the at least one user of the graphical element, reducing perceptual inconsistencies between the given eye and the another eye of the at least one user while ensuring that the graphical element remains perceptually distinguishable for both eyes under asymmetric real-world lighting conditions.

Optionally, the method further comprising:
detecting when the colour of said portion of the real-world light field differs from the colour of the another portion of the real-world light field, and when an adjustment in the colour of the graphical element for the given eye conflicts with an adjustment in the colour of the graphical element for the another eye; and
when it is detected that the colour of said portion of the real-world light field differs from the colour of the another portion of the real-world light field, and that the adjustment in the colour of the graphical element for the given eye conflicts with the adjustment in the colour of the graphical element for the another eye,
outputting a voice notification related to the graphical element via a speaker.

A key technical benefit of detecting that the colour of the portion of the real-world light field differs from the colour of the another portion of the real-world light field, detecting that the adjustment in the colour of the graphical element for the given eye conflicts with the adjustment in the colour of the graphical element for the another eye, and outputting a voice notification related to the graphical element via a speaker, is provision of an alternative modality for conveying information when visual presentation of the graphical element cannot be resolved consistently across both eyes of the at least one user. The detection of conflict between the colour adjustment for the given eye and the colour adjustment for the another eye reflects a condition in which visibility of the graphical element may be degraded or ambiguous, and adequate visibility of the graphical element cannot be guaranteed solely through colour adjustment. The output of the voice notification via the speaker allows the information associated with the graphical element to be delivered to the at least one user through an auditory channel, thereby supplementing or replacing the visual content. The output of the voice notification via the speaker allows continuity in delivery of the information associated with the graphical element, even in scenarios where conflict between the colour adjustments for the given eye and the another eye cannot be resolved through display of the synthetic light field.

Optionally, the method further comprising:
determining gaze directions of the eyes of the at least one user, using the tracker;
determining a focus depth at which the at least one user is gazing, based on the gaze directions of the eyes;
generating a depth map of the real-world environment using at least one real-world facing depth camera;
determining an optical depth at which a real-world object is present, based on the depth map and the gaze directions of the eyes;
detecting when a first difference between the focus depth and an optical depth at which the graphical element is being presented via the synthetic light field is smaller than a first predefined threshold difference, and when a second difference between the focus depth and the optical depth at which the real-world object is present is greater than a second predefined threshold difference; and
when it is detected that the first difference is smaller than the first predefined threshold difference and the second difference is greater than the second predefined threshold difference, performing at least one of:

applying a defocus blur on the at least one real-world image of the real-world environment, before determining the colour and luminance of said portion of the real-world light field;
expanding the corresponding portion of the optical combiner used for determining the colour and luminance of said portion of the real-world light field.

A key technical benefit of determining the gaze directions of the eyes of the at least one user using the tracker, determining the focus depth at which the at least one user is gazing based on the gaze directions of the eyes, generating the depth map of the real-world environment using the at least one real-world facing depth camera, determining the optical depth at which the real-world object is present based on the depth map and the gaze directions of the eyes, detecting that the first difference between the focus depth and the optical depth at which the graphical element is being presented via the synthetic light field is smaller than the first predefined threshold difference, and detecting that the second difference between the focus depth and the optical depth at which the real-world object is present is greater than the second predefined threshold difference, is adjustment of the calculation of the colour and the luminance of the portion of the real-world light field when the at least one user is looking at the graphical element of colour and luminance estimation for the graphical element when the at least one user is gazing at the graphical element and not at the real-world object. The condition that the first difference is smaller than the first predefined threshold difference corresponds to the graphical element being positioned close to the focus depth. The condition that the second difference is greater than the second predefined threshold difference corresponds to the real-world object being positioned far from the focus depth, such that the at least one user is not looking at the real-world object.

In response to detection of this condition, applying the defocus blur on the at least one real-world image of the real-world environment before determining the colour and the luminance of the portion of the real-world light field enables estimation of background characteristics that match the perceptual defocus experienced by the at least one user. Alternatively, expanding the corresponding portion of the optical combiner used for determining the colour and the luminance of the portion of the real-world light field enables use of a broader sampling region that reflects the lower spatial precision of the real-world object when outside the user's focal range. The application of the defocus blur on the at least one real-world image and the expansion of the corresponding portion of the optical combiner contribute to improved calculation of the colour and the luminance of the portion of the real-world light field under attention-directed depth conditions, allowing the graphical element to remain perceptually coherent with the presentation of the graphical element at a depth that is closer to the focus depth than the real-world object of the at least one user.

Optionally, the method further comprising:
determining at least one of: a colour scheme, a colour temperature, of at least the portion of the real-world light field, based on the at least one real-world image;
determining a colour grading adjustment for the graphical element, based on the luminance of said portion of the real-world light field, and the at least one of: the colour scheme, the colour temperature, of at least the portion of the real-world light field; and
adjusting the colour of the graphical element by applying the colour grading adjustment.

A key technical benefit of determining at least one of a colour scheme or a colour temperature of at least the portion of the real-world light field based on the at least one real-world image, determining the colour grading adjustment for the graphical element based on the luminance of the portion of the real-world light field and the at least one of the colour scheme or the colour temperature of at least the portion of the real-world light field, and adjusting the colour of the graphical element by applying the colour grading adjustment, is visual integration of the graphical element with the appearance of the portion of the real-world light field. The determination of the colour scheme or the colour temperature may be performed for at least the portion of the real-world light field, or alternatively, for an entirety of the real-world light field, and may optionally be based further on a light sensor in addition to the at least one real-world image.

The determination of the colour grading adjustment allows the graphical element to reflect the colour scheme and colour temperature of the portion of the real-world light field of the portion of the real-world light field. The application of the colour grading adjustment modifies at least one of a hue component, a saturation level, or the luminance of the graphical element, thereby enabling the graphical element to visually blend with the surrounding environment. The resulting effect allows the graphical element to remain perceptually coherent under varying environmental colour conditions, contributing to consistency between the synthetic light field and the real-world light field.

DETAILED DESCRIPTION OF THE DRAWINGS

FIG. 1 shows an exemplary implementation of an augmented reality system 100, in accordance with an embodiment of the present disclosure. The augmented reality system 100 comprises a tracker 102, a display 104, an optical combiner 106 arranged on an optical path of the display 104 and on an optical path of a real-world light field 108 (indicated using a long-dashed arrow) of a real-world environment 110, at least one real-world facing camera 112 and at least one processor 114. As shown, the optical combiner 106 is arranged at a tilted angle with respect to eyes 116 of at least one user.

The at least one processor 114 is configured to:
determine a relative position of each eye 116 of at least one user with respect to the optical combiner 106, using the tracker 102;
generate or retrieve an image to be displayed, based on the relative position of each eye 116 of the at least one user with respect to the optical combiner 106;
for a given region of the image that represents a graphical element, determine a corresponding portion of the optical combiner 106 from which light rays of the given region of the image are to be reflected toward a given eye of the at least one user during display of the image, based on a relative position of the given eye with respect to the optical combiner 106, a relative position and orientation of the optical combiner 106 with respect to the display 104, and a position of the given region in the image;
capture at least one real-world image of the real-world environment 110 using the at least one real-world facing camera 112;
determine a colour and luminance of a portion of the real-world light field 108 that passes through the corresponding portion of the optical combiner 106 toward the given eye, based on the at least one real-world image and the relative position of the given eye with respect to the optical combiner 106;
calculate a colour difference and a luminance difference for the given eye between the colour and luminance of said portion of the real-world light field 108 and a colour and luminance of the graphical element;
adjust at least one of: the colour, the luminance, a size, at least one iconographic parameter of the graphical element in the given region of the image, based on the colour difference and the luminance difference for the given eye; and
display the image via the display for producing a synthetic light field, wherein the optical combiner 106 is employed to reflect a corresponding portion of the synthetic light field toward the given eye, whilst optically combining the corresponding portion of the synthetic light field with said portion of the real-world light field 108.

It may be understood by a person skilled in the art that FIG. 1 shows a simplified implementation of the system 100, for sake of clarity, which should not unduly limit the scope of the claims herein. The person skilled in the art will recognize many variations, alternatives, and modifications of embodiments of the present disclosure. For example, the system 100 can comprise additional components, such as, one or more additional trackers, displays, optical combiners and so forth.

Figure 2:
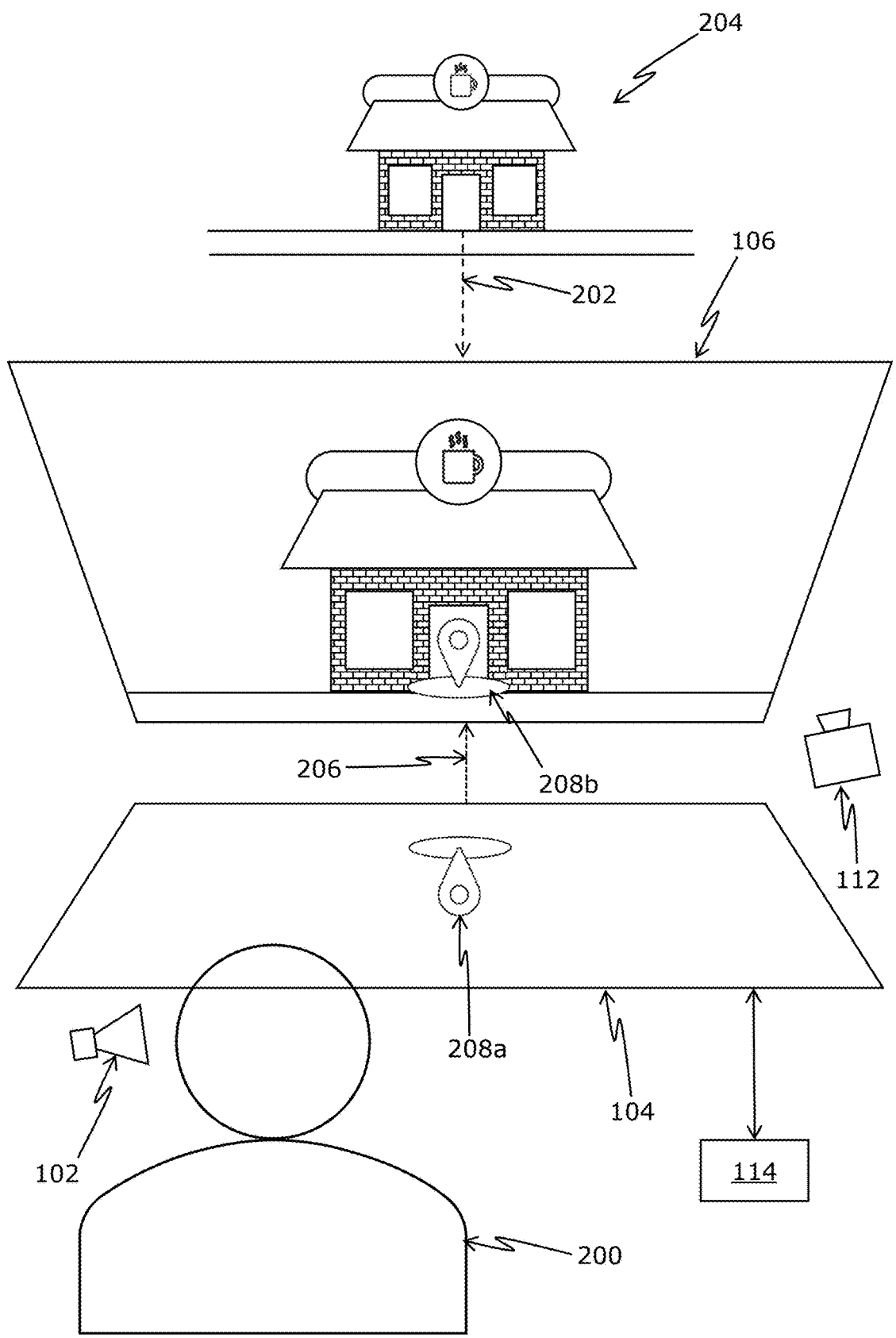
FIG. 2 shows an exemplary operation of the augmented reality system of FIG. 1, in accordance with an embodiment of the present disclosure.

FIG. 2 shows an exemplary operation of the augmented reality system 100 of FIG. 1, in accordance with an embodiment of the present disclosure. As shown, the augmented reality system is implemented in an automotive display integrated into a windshield of a vehicle operated by a user 200. The optical combiner 106 of the augmented reality system 100 forms the windshield of the vehicle, such that the optical combiner 106 is arranged on an optical path of the real-world light field 202 (indicated using a dashed arrow) associated with a real-world environment 204 and on an optical path of the synthetic light field 206 (indicated using a short-dashed arrow) generated from the image displayed via the display 104.

The display 104 is positioned beneath the optical combiner 106, and the real-world facing camera 112 is oriented toward the real-world environment 204. As shown, the real-world environment 110 includes a café that is a navigation destination for the user 200. As the vehicle is driven toward the café, the display 104 produces the image that includes a graphical element 208a in the form of a location chevron. The graphical element 208a is rendered in the image (seen as 208b) and reflected from a corresponding portion of the optical combiner 106 toward the given eye of the user 200, thereby appearing as spatially overlaid on the café from the viewpoint of the user 200.

The graphical element 208a is initially rendered with a light colour, such as white, and the luminance of the graphical element 208a is lower than the luminance of the portion of the real-world light field 202 that passes through the corresponding portion of the optical combiner 106 toward the given eye of the user 200.

The real-world facing camera 112 captures the at least one real-world image of the real-world environment 204, and the at least one processor 114 determines the portion of the real-world light field 202 corresponding to the given region of the image and the given eye of the user 200. The at least one processor 114 calculates the colour difference and the luminance difference between the graphical element 208a and the portion of the real-world light field 202, and determines that the colour difference is below a predefined threshold colour difference and the luminance of the graphical element 208*a* is lower by more than a predefined threshold luminance difference.

Figure 3:
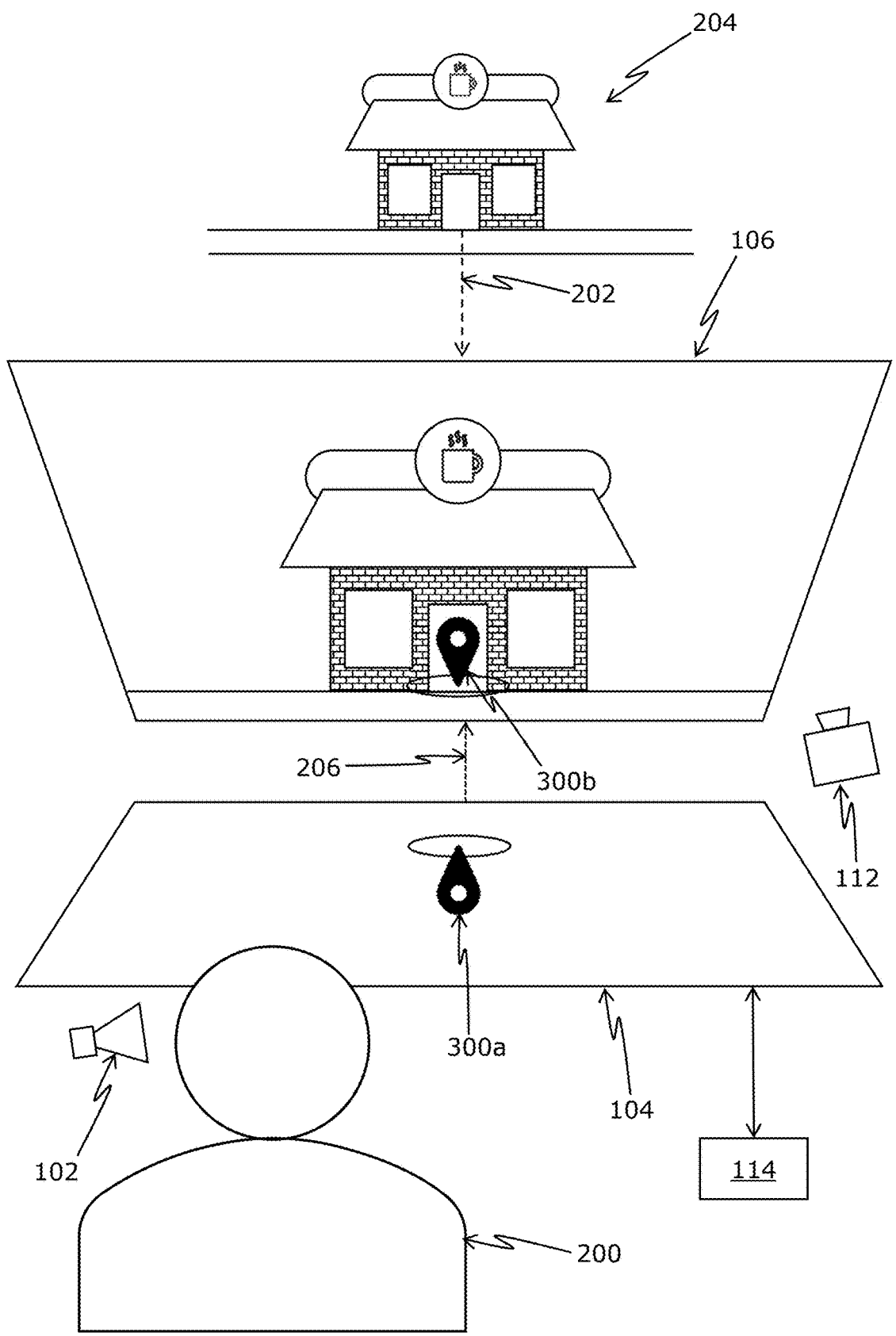
FIG. 3 shows a continuation of the exemplary operation of the augmented reality system shown in FIG. 2, in accordance with an embodiment of the present disclosure.

FIG. 3 shows a continuation of the exemplary operation of the augmented reality system 100 shown in FIG. 2, in accordance with an embodiment of the present disclosure. As shown, the at least one processor 114 adjusts at least one of the colour and at least one iconographic parameter of the graphical element 300*a* in the image displayed via the display 104. In the operating scenario shown, the real-world light field 202 corresponding to the background of the café in the real-world environment 204, such as a brightly-lit indoor area of the café seen through a transparent entrance to the café. The at least one processor 114 changes the colour of the graphical element 300*a* to a darker colour based on the calculated colour difference so that the graphical element 300*b* remains visually distinguishable from the portion of the real-world light field 202. The optical combiner 106 reflects the adjusted graphical element 300*b* toward the given eye of the user 200, allowing the café in the real-world environment 204 to be clearly indicated as the navigation destination through the adjusted graphical element 300*a*, under background conditions associated with high brightness.

Figure 4:
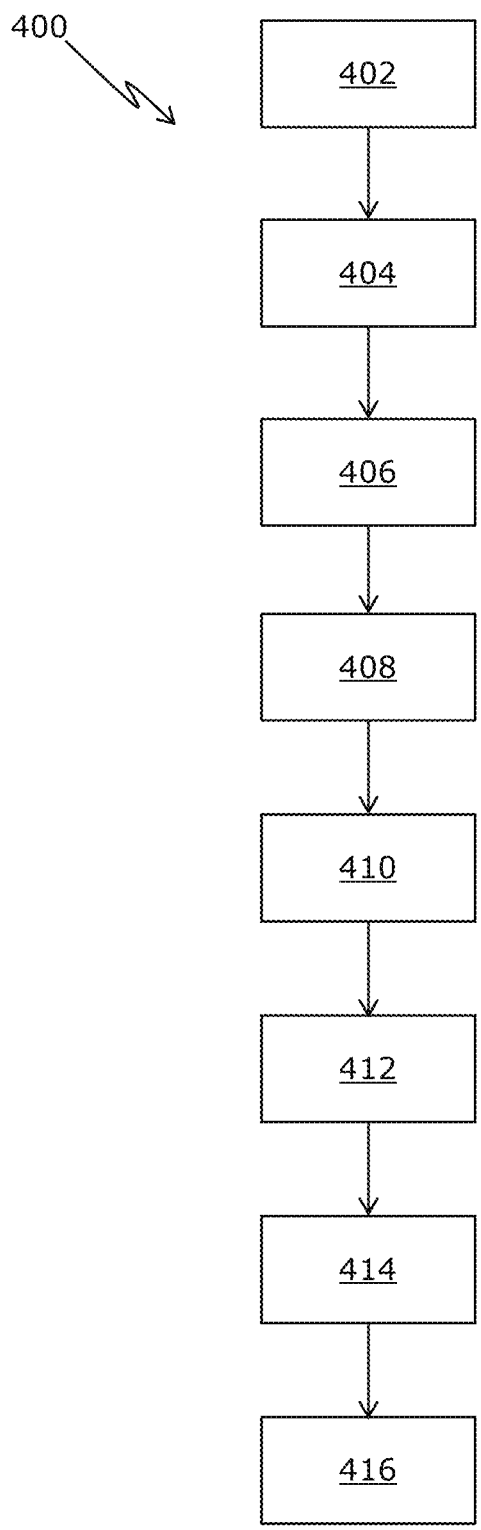
FIG. 4 shows steps of a method, in accordance with an embodiment of the present disclosure.

FIG. 4 shows steps of a method 400, in accordance with an embodiment of the present disclosure.

At step 402, a relative position of each eye of at least one user is determined with respect to an optical combiner, using a tracker, wherein the optical combiner is arranged on an optical path of a display and on an optical path of a real-world light field of a real-world environment;

at step 404, an image to be displayed is generated or retrieved, based on the relative position of each eye of the at least one user with respect to the optical combiner;

at step 406, for a given region of the image that represents a graphical element, a corresponding portion of the optical combiner is determined from which light rays of the given region of the image are to be reflected toward a given eye of the at least one user during display of the image, based on a relative position of the given eye with respect to the optical combiner, a relative position and orientation of the optical combiner with respect to the display, and a position of the given region in the image;

at step 408, at least one real-world image of the real-world environment is captured using at least one real-world facing camera;

at step 410, a colour and luminance of a portion of the real-world light field that passes through the corresponding portion of the optical combiner toward the given eye is determined, based on the at least one real-world image and the relative position of the given eye with respect to the optical combiner;

at step 412, a colour difference and a luminance difference is calculated for the given eye between the colour and luminance of said portion of the real-world light field and a colour and luminance of the graphical element;

at step 414, at least one of: the colour, the luminance, a size, at least one iconographic parameter of the graphical element in the given region of the image, is adjusted, based on the colour difference and the luminance difference for the given eye; and at step 416, the image is displayed via the display for producing a synthetic light field, wherein the optical combiner is employed to reflect a corresponding portion of the synthetic light field toward the given eye, whilst optically combining the corresponding portion of the synthetic light field with said portion of the real-world light field.

The aforementioned steps are only illustrative and other alternatives can also be provided where one or more steps are added, one or more steps are removed, or one or more steps are provided in a different sequence without departing from the scope of the claims herein.

The invention claimed is:

1. An augmented reality system comprising:
 a tracker;
 a display;
 an optical combiner arranged on an optical path of the display and on an optical path of a real-world light field of a real-world environment;
 at least one real-world facing camera; and
 at least one processor configured to:
  determine a relative position of each eye of at least one user with respect to the optical combiner, using the tracker;
  generate or retrieve an image to be displayed, based on the relative position of each eye of the at least one user with respect to the optical combiner;
  for a given region of the image that represents a graphical element, determine a corresponding portion of the optical combiner from which light rays of the given region of the image are to be reflected toward a given eye of the at least one user during display of the image, based on a relative position of the given eye with respect to the optical combiner, a relative position and orientation of the optical combiner with respect to the display, and a position of the given region in the image;
  capture at least one real-world image of the real-world environment using the at least one real-world facing camera;
  determine a colour and luminance of a portion of the real-world light field that passes through the corresponding portion of the optical combiner toward the given eye, based on the at least one real-world image and the relative position of the given eye with respect to the optical combiner;
  calculate a colour difference and a luminance difference for the given eye between the colour and luminance of said portion of the real-world light field and a colour and luminance of the graphical element;
  adjust at least one of: the colour, the luminance, a size, at least one iconographic parameter of the graphical element in the given region of the image, based on the colour difference and the luminance difference for the given eye; and
  display the image via the display for producing a synthetic light field, wherein the optical combiner is employed to reflect a corresponding portion of the synthetic light field toward the given eye, whilst optically combining the corresponding portion of the synthetic light field with said portion of the real-world light field.

2. The augmented reality system of claim 1, wherein the at least one processor is configured to:
 detect when the colour difference is below a predefined threshold colour difference; and
 when it is detected that the colour difference is below the predefined threshold colour difference, adjust the colour of the graphical element by changing it to a contrasting colour relative to the colour of said portion of the real-world light field.

3. The augmented reality system of claim 1, wherein the at least one processor is configured to:
   obtain information indicative of at least one pair of colours that is known to cause perceptual confusion for the at least one user due to colour blindness;
   detect when the colour of said portion of the real-world light field and the colour of the graphical element form one of the at least one pair of colours; and
   when it is detected that the colour of said portion of the real-world light field and the colour of the graphical element form one of the at least one pair of colours, adjust the colour of the graphical element by changing it to another colour that, in combination with the colour of said portion of the real-world light field, does not form any of the at least one pair of colours.

4. The augmented reality system of claim 1, wherein the at least one processor is configured to:
   detect when the luminance of said portion of the real-world light field is more than the luminance of the graphical element by more than a predefined threshold luminance difference; and
   when it is detected that the luminance of said portion of the real-world light field is more than the luminance of the graphical element by more than the predefined threshold luminance difference, perform at least one of:
   adjusting the luminance of the graphical element by increasing it;
   adjusting the size of the graphical element by increasing it;
   adjusting the at least one iconographic parameter of the graphical element by performing at least one of: increasing a stroke weight of the graphical element, increasing an outline thickness of the graphical element, decreasing a number of features in the graphical element.

5. The augment reality system of claim 1, wherein the at least one processor is configured to:
   for the given region of the image that represents the graphical element, determine another corresponding portion of the optical combiner from which the light rays of the given region of the image are to be reflected toward another eye of the at least one user during display of the image, based on a relative position of the another eye with respect to the optical combiner, the relative position and orientation of the optical combiner with respect to the display, and the position of the given region in the image;
   determine a colour and luminance of another portion of the real-world light field that passes through the another corresponding portion of the optical combiner toward the another eye, based on the at least one real-world image and the relative position of the another eye with respect to the optical combiner;
   calculate a colour difference and a luminance difference for the another eye between the colour and luminance of the another portion of the real-world light field and the colour and luminance of the graphical element; and
   adjust at least one of: the colour, the luminance, the size, the at least one iconographic parameter of the graphical element in the given region of the image, based further on the colour difference and the luminance difference for the another eye,
   wherein the optical combiner is employed to reflect another corresponding portion of the synthetic light field toward the another eye, whilst optically combining the another corresponding portion of the synthetic light field with the another portion of the real-world light field.

6. The augmented reality system of claim 5, wherein the at least one processor is configured to:
   detect when the colour of said portion of the real-world light field differs from the colour of the another portion of the real-world light field, and when an adjustment in the colour of the graphical element for the given eye conflicts with an adjustment in the colour of the graphical element for the another eye; and
   when it is detected that the colour of said portion of the real-world light field differs from the colour of the another portion of the real-world light field, and that the adjustment in the colour of the graphical element for the given eye conflicts with the adjustment in the colour of the graphical element for the another eye,
   determine whether the given eye or the another eye is a dominant eye of the at least one user; and
   adjust the colour of the graphical element for both the given eye and the another eye, based on the colour difference and the luminance difference for the dominant eye.

7. The augmented reality system of claim 5, wherein the at least one processor is configured to:
   detect when the colour of said portion of the real-world light field differs from the colour of the another portion of the real-world light field, and when an adjustment in the colour of the graphical element for the given eye conflicts with an adjustment in the colour of the graphical element for the another eye; and
   when it is detected that the colour of said portion of the real-world light field differs from the colour of the another portion of the real-world light field, and that the adjustment in the colour of the graphical element for the given eye conflicts with the adjustment in the colour of the graphical element for the another eye,
   determine a compromise colour for both the given eye and the another eye, based on the colour difference and the luminance difference for the given eye, and the colour difference and the luminance difference for the another eye; and
   adjust the colour of the graphical element by changing it to the compromise colour for both the given eye and the another eye.

8. The augmented reality system of claim 5, further comprising a speaker, wherein the at least one processor is configured to:
   detect when the colour of said portion of the real-world light field differs from the colour of the another portion of the real-world light field, and when an adjustment in the colour of the graphical element for the given eye conflicts with an adjustment in the colour of the graphical element for the another eye; and
   when it is detected that the colour of said portion of the real-world light field differs from the colour of the another portion of the real-world light field, and that the adjustment in the colour of the graphical element for the given eye conflicts with the adjustment in the colour of the graphical element for the another eye,
   output a voice notification related to the graphical element via the speaker.

9. The augmented reality system of claim 1, further comprising at least one real-world facing depth camera, wherein the at least one processor is configured to:
   determine gaze directions of the eyes of the at least one user, using the tracker;
   determine a focus depth at which the at least one user is gazing, based on the gaze directions of the eyes;

generate a depth map of the real-world environment using the at least one real-world facing depth camera;

determine an optical depth at which a real-world object is present, based on the depth map and the gaze directions of the eyes;

detect when a first difference between the focus depth and an optical depth at which the graphical element is being presented via the synthetic light field is smaller than a first predefined threshold difference, and when a second difference between the focus depth and the optical depth at which the real-world object is present is greater than a second predefined threshold difference; and when it is detected that the first difference is smaller than the first predefined threshold difference and the second difference is greater than the second predefined threshold difference, perform at least one of:

apply a defocus blur on the at least one real-world image of the real-world environment, before determining the colour and luminance of said portion of the real-world light field;

expand the corresponding portion of the optical combiner used for determining the colour and luminance of said portion of the real-world light field.

10. The augmented reality system of claim 1, wherein the at least one processor is configured to:

determine gaze directions of the eyes of the at least one user, using the tracker;

detect when the image represents a plurality of graphical elements; and when it is detected that the image represents the plurality of graphical elements, identify a graphical element from the plurality of graphical elements based on the gaze directions of the eyes; and perform the step of determining the corresponding portion of the optical combiner, the step of determining the colour and luminance of the portion of the real-world light field, the step of calculating the colour difference and the luminance difference, and the step of adjusting, for the graphical element that is identified based on the gaze directions.

11. The augmented reality system of claim 1, wherein the at least one processor is configured to:

determine at least one of: a colour scheme, a colour temperature, of at least the portion of the real-world light field, based on the at least one real-world image;

determine a colour grading adjustment for the graphical element, based on the luminance of said portion of the real-world light field, and the at least one of: the colour scheme, the colour temperature, of at least the portion of the real-world light field; and adjust the colour of the graphical element by applying the colour grading adjustment.

12. A method comprising:

determining a relative position of each eye of at least one user with respect to an optical combiner, using a tracker, wherein the optical combiner is arranged on an optical path of a display and on an optical path of a real-world light field of a real-world environment;

generating or retrieving an image to be displayed, based on the relative position of each eye of the at least one user with respect to the optical combiner;

for a given region of the image that represents a graphical element, determining a corresponding portion of the optical combiner from which light rays of the given region of the image are to be reflected toward a given eye of the at least one user during display of the image, based on a relative position of the given eye with respect to the optical combiner, a relative position and orientation of the optical combiner with respect to the display, and a position of the given region in the image;

capturing at least one real-world image of the real-world environment using at least one real-world facing camera;

determining a colour and luminance of a portion of the real-world light field that passes through the corresponding portion of the optical combiner toward the given eye, based on the at least one real-world image and the relative position of the given eye with respect to the optical combiner;

calculating a colour difference and a luminance difference for the given eye between the colour and luminance of said portion of the real-world light field and a colour and luminance of the graphical element;

adjusting at least one of: the colour, the luminance, a size, at least one iconographic parameter of the graphical element in the given region of the image, based on the colour difference and the luminance difference for the given eye; and displaying the image via the display for producing a synthetic light field, wherein the optical combiner is employed to reflect a corresponding portion of the synthetic light field toward the given eye, whilst optically combining the corresponding portion of the synthetic light field with said portion of the real-world light field.

13. The method of claim 12, further comprising:

detecting when the colour difference is below a predefined threshold colour difference; and when it is detected that the colour difference is below the predefined threshold colour difference, adjusting the colour of the graphical element by changing it to a contrasting colour relative to the colour of said portion of the real-world light field.

14. The method of claim 12, further comprising:

obtaining information indicative of at least one pair of colours that is known to cause perceptual confusion for the at least one user due to colour blindness;

detecting when the colour of said portion of the real-world light field and the colour of the graphical element form one of the at least one pair of colours; and when it is detected that the colour of said portion of the real-world light field and the colour of the graphical element form one of the at least one pair of colours, adjusting the colour of the graphical element by changing it to another colour that, in combination with the colour of said portion of the real-world light field, does not form any of the at least one pair of colours.

15. The method of claim 12, further comprising:

detecting when the luminance of said portion of the real-world light field is more than the luminance of the graphical element by more than a predefined threshold luminance difference; and when it is detected that the luminance of said portion of the real-world light field is more than the luminance of the graphical element by more than the predefined threshold luminance difference, performing at least one of:

adjusting the luminance of the graphical element by increasing it;

adjusting the size of the graphical element by increasing it;

adjusting the at least one iconographic parameter of the graphical element by performing at least one of: increasing a stroke weight of the graphical element, increasing an outline thickness of the graphical element, decreasing a number of features in the graphical element.

16. The method of claim 12, further comprising:

for the given region of the image that represents the graphical element, determining another corresponding portion of the optical combiner from which the light rays of the given region of the image are to be reflected toward another eye of the at least one user during display of the image, based on a relative position of the another eye with respect to the optical combiner, the relative position and orientation of the optical combiner with respect to the display, and the position of the given region in the image;

determining a colour and luminance of another portion of the real-world light field that passes through the another corresponding portion of the optical combiner toward the another eye, based on the at least one real-world image and the relative position of the another eye with respect to the optical combiner;

calculating a colour difference and a luminance difference for the another eye between the colour and luminance of the another portion of the real-world light field and the colour and luminance of the graphical element; and adjusting at least one of: the colour, the luminance, the size, the at least one iconographic parameter of the graphical element in the given region of the image, based further on the colour difference and the luminance difference for the another eye, wherein the optical combiner is employed to reflect another corresponding portion of the synthetic light field toward the another eye, whilst optically combining the another corresponding portion of the synthetic light field with the another portion of the real-world light field.

17. The method of claim 16, further comprising:

detecting when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, determining whether the given eye or the another eye is a dominant eye of the at least one user; and adjusting the colour of the graphical element for both the given eye and the another eye, based on the colour difference and the luminance difference for the dominant eye.

\* \* \* \* \*